United States Patent [19]
Varvel et al.

[11] 4,112,292
[45] Sep. 5, 1978

[54] MAGNETIC IDENTIFICATION APPARATUS

[75] Inventors: David Anthony Varvel, Mosman; Frederick William Millar, Frankston; Stuart Connall Farquharson, Manly, all of Australia

[73] Assignee: Access Control Systems Proprietary Limited, Victoria, Australia

[21] Appl. No.: 769,532

[22] Filed: Feb. 17, 1977

[30] Foreign Application Priority Data

Aug. 17, 1976 [AU] Australia ............................ 7034/76

[51] Int. Cl.² ............................................. G06K 7/08
[52] U.S. Cl. ............................................. 235/449
[58] Field of Search .............. 235/61.11 D, 61.11 R, 235/61.7 B, 449, 450

[56] References Cited
U.S. PATENT DOCUMENTS

| | | | |
|---|---|---|---|
| 3,634,657 | 1/1972 | Ballard et al. ............... | 235/61.11 D |
| 3,858,032 | 12/1974 | Scantlin ...................... | 235/61.11 R |
| 3,896,292 | 7/1975 | May et al. .................... | 235/61.11 D |
| 3,953,712 | 4/1976 | Horvath ....................... | 235/61.11 D |

Primary Examiner—Daryl W. Cook
Attorney, Agent, or Firm—Biebel, French & Nauman

[57] ABSTRACT

Access control system in which a magnetically coded key or card is inserted into a reader which reads the recorded code. The key is coded by small permanent magnets embedded in non-magnetic body of the key at positions on a 4 × 4 regular grid of possible positions. The reader includes 16 Hall Effect devices which are disposed adjacent keyway in the reader so as to register with the 16 possible magnet positions on the key when the key is inserted. Signals are generated in those Hall effect devices which register with magnets in the key and these signals are amplified to produce reader output.

5 Claims, 11 Drawing Figures

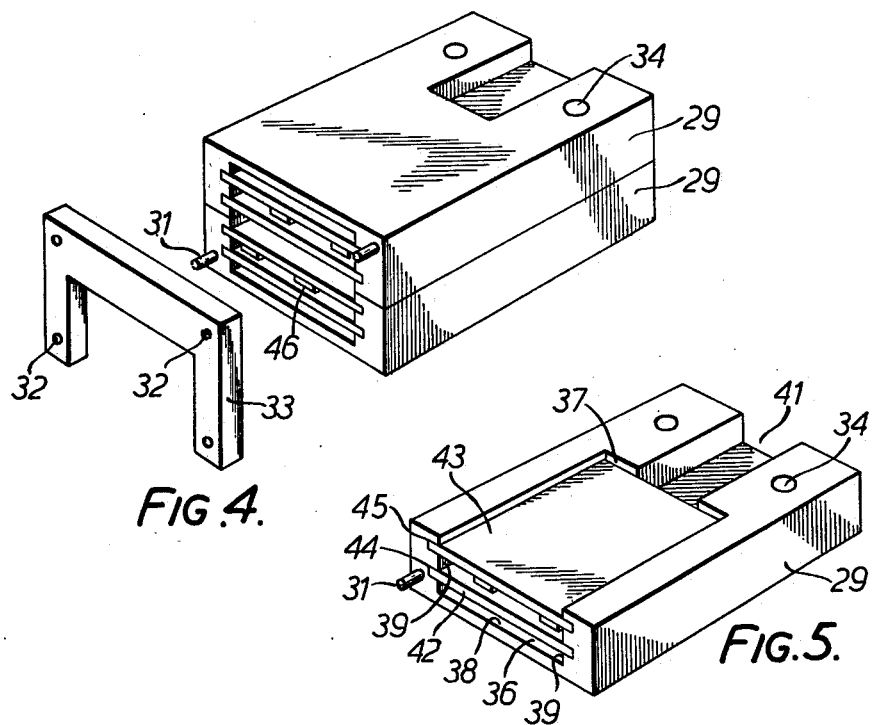
FIG. 4.
FIG. 5.
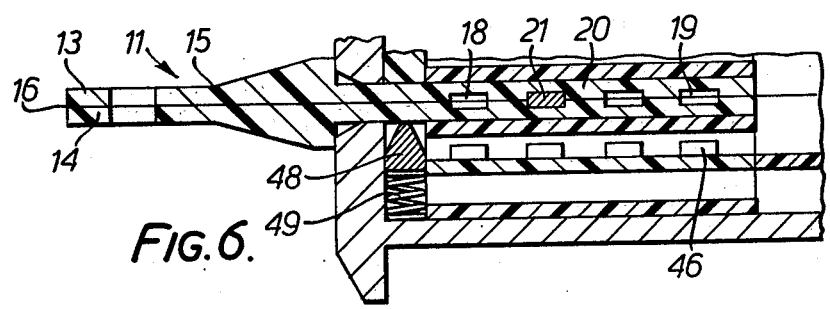
FIG. 6.
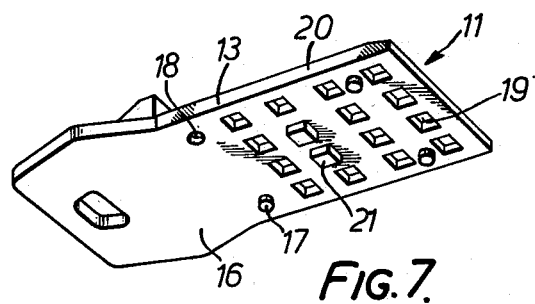
FIG. 7.

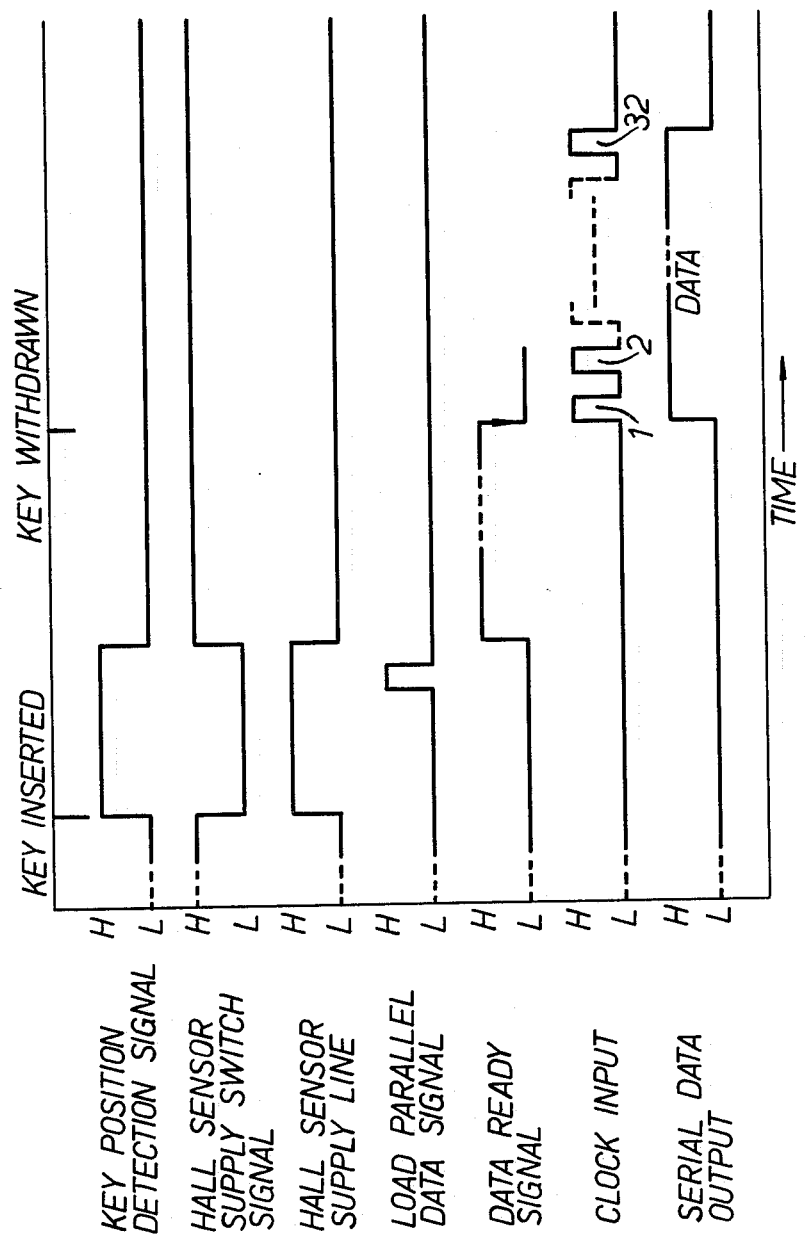

MAGNETIC IDENTIFICATION APPARATUS

BACKGROUND OF THE INVENTION

1. Field of the Invention

This invention relates to control systems in which an instrument such as a key or card having a code recorded on it is submitted to a reader which reads the recorded code. Such control systems may be used in magnetic locks and various accounting and credit control facilities. In the case of a magnetic locking system the reader would control the portion of a lock and the coded instrument may be in the form of a key which is inserted into the reader. In the case of credit control systems the instrument would usually be in the form of a coded card.

2. Description of Prior Art

Australian patent application No. 65612/74 and granted U.S. Pat. No. 3,953,712 disclose a system in which a magnetically coded instrument is inserted into a guideway of a reader. The reader includes a number of sensing coils disposed adjacent to the guideway and electromotive forces are generated in those sensing coils by the movement of the magnetized portions of the instrument across them as the instrument approaches the end of its forward travel along the guideway. The electromotive forces generated in the sensing coils are amplified and influence the condition of an output circuit so as to cause generation of an output signal. This system has been generally satisfactory in service and has been commercially successful. However, it has been found that correct generation of potential difference signals in the sensing coils is dependent upon the speed at which the instrument is inserted into the guideway and some operator technique is required. The present invention provides a modification or improvement which avoids this difficulty. The modified system according to the present invention can also be more readily adapted to transmit signals in serial form rather than in parallel, which enables a simplification in the electrical wiring and generation of an output which is computer compatible.

SUMMARY OF THE INVENTION

According to the invention there is provided magnetic identification apparatus comprising a magnetically coded instrument including a plurality of discrete magnetized portions the disposition of which determines the magnetic code of the instrument and a reader to which to apply the instrument, said reader comprising:

a body defining instrument setting means to set the instrument in a set position relative to the body;

a plurality of sensor elements mounted on the body so as to register with said magnetic portions of the instrument when the instrument is in said set position, which sensor elements are each comprised of a Hall Effect device including a semi-conductor layer, a pair of control current electrodes through which to pass a control current through the semi-conductor layer in one direction and a pair of sensor electrodes through which to sense a potential difference between locations on the semi-conductor layer which are spaced apart in a direction transverse to said one direction;

electrical input means to supply control current to the electrodes of the Hall Effect devices; and electric output means conditioned by the generation of potential differences between the sensing electrodes of the Hall Effect devices to provide an electrical output from the reader, the Hall Effect devices being orientated such that said potential differences are generated by the presence of the magnetic fields of said magnetized portions of the instrument when the instrument is in said set position.

Preferably said instrument setting means is in the form of a guideway along which the instrument is moved to said set position and the reader further includes switch means normally rendering the electric input means ineffective to supply control current through the control current electrodes of the Hall Effect devices but responsive to insertion of the instrument into the guideway to render said electrode means operative when the instrument reaches said set position.

Preferably too, the instrument has a flat plate part which carries the magnetized portions, the guideway is a flat cavity slidably to receive the flat plate part of the instrument and the sensor elements are disposed adjacent the cavity with their semi-conductor layers parallel with the general plane of the cavity. More particularly, the semi-conductor layers of the Hall Effect devices may be disposed in general planes which are disposed to either side of and parallel with the general plane of the cavity.

DESCRIPTION OF DRAWINGS

In order that the invention may be more fully explained one particular embodiment will be described in detail with reference to the accompanying drawings in which:

FIG. 4 is a perspective view of components which form the code reading part of the reader;

FIG. 5 is a perspective view of one of the components shown in FIG. 4;

FIG. 6 is an enlarged cross-section of part of the reader after insertion of a magnetically coded key;

FIG. 7 is a perspective view of part of the key;

FIG. 11 is a timing diagram showing the sequence of operations in the reader.

DESCRIPTION OF THE PREFERRED EMBODIMENT

Figure 1:
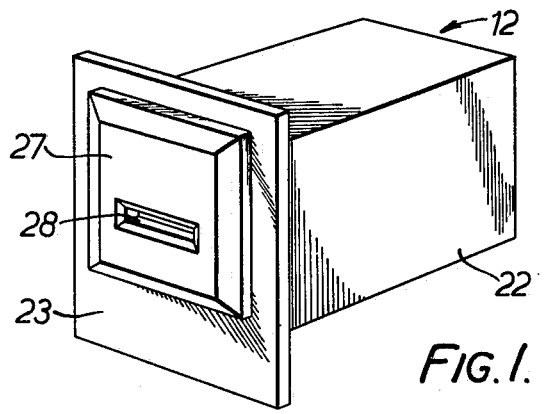
FIG. 1 is a perspective view of a reader to read magnetically coded keys.
Figure 2:
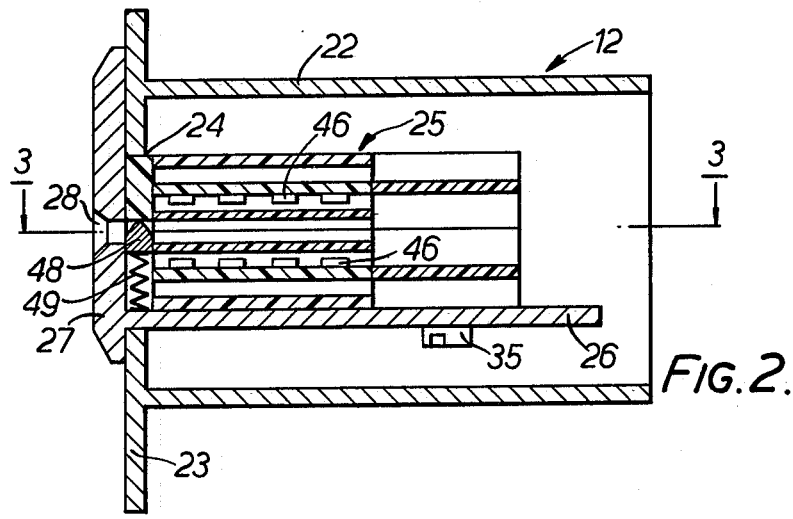
FIG. 2 is a vertical cross-section through the reader.

The illustrated apparatus is generally similar in layout to that described in Australian patent application No. 65612/74 and granted U.S. Pat. No. 3,953,712 but, in accordance with the present invention, it uses Hall Effect devices to generate signals representative of the code to be read. The system makes use of an instrument 11 in the shape of a key which is fitted with a number of magnets at selected positions in a matrix of possible positions. There may, as illustrated, be sixteen possible positions disposed in a 4 × 4 matrix. The key is inserted into a reader 12 fitted with a number of sensor elements in which signals are generated by the presence of the magnets. These signals may be used to initiate various functions depending on the particular application of the system.

As seen in FIGS. 6 and 7 instrument 11 is comprised of a pair of body portions 13, 14 which fit together at a flat interface 16 to form a key shaped body having a head 15 and a rectangular flat plate part 20. The two body portions are identical. They are moulded from tough non-magnetic plastics material such as glass fibre reinforced nylon and have interengaging pegs 17 and holes 18 at the interface 16. At this interface they are also each provided with sixteen recesses 19 arranged in a 4 × 4 matrix so that when the two body portions are fitted together sixteen closed pockets 18 are formed within the key and the key is coded by the inclusion of small permanent magnets 21 within selected pockets of the matrix. Magnets 21 may be formed as small discs or cylinders of permanently magnetized metal, i.e. they may be unisotropic magnets. It would, however, be possible to install isotropic magnets which would lose their magnetism after a set period so enabling the issue of keys which would be effective for a limited period only. The key is coded according to the number and disposition of magnets 21 in the matrix of sixteen pockets. It will be appreciated that with the sixteen positions available for installation of magnets and the fact that the polarity of the magnets may be reversed simply by physical inversion of the number of possible code combinations is very large indeed.

Reader 12 comprises a rectangular outer casing 22 having an extended front plate 23 forming a peripheral flange at the front end of the casing. Front plate 23 has a rectangular opening 24 through which a reader unit 25 is inserted into the casing.

Reader unit 25 is mounted on a base plate 26 formed integrally with an escutcheon plate 27 which comes flat against the casing front plate 23 when the reader unit is inserted into the casing and then covers the opening 24 in the front plate. Escutcheon plate 27 has a slot 28 through which to insert the magnetically coded front plate part 20 of key 11 into reader unit 25.

Reader unit 25 comprises a pair of sensor housings 29 which are moulded from a tough plastics material such as DELRIN (Registered Trade Mark). These housings are stacked one on top of the other and held together at their front ends by the engagement of pins 31 with holes 32 in an inverted U-shaped yoke member 33. The rear ends of the housings are provided with aligned holes 34 to receive screws 35 which hold the rear ends of the housings together and connect them to base plate 26. Yoke member 33 may be moulded from the same material as housings 29.

The two housings 29 are of identical construction and on assembly of the sensor unit one is simply inverted relative to the other. The construction of each housing is most clearly seen in FIG. 5. As indicated in that figure it is formed as a block, the front end of which has a deep well or recess 36 extending from an open top 37 to a floor 38 and bounded by side walls 39. A channel 41 extends from the rear end of recess 36 through to the rear end of the block. Recess 36 receives two plates 42, 43 which are simply slid into position from the front end of the housing block with their side edges engaged with respective pairs of grooves 44, 45 formed in side walls 39. Plate 42 is in the form of a printed circuit board which carries Hall Effect sensor devices 46 whereas plate 43 is a simple flat plate of plastics material which forms one face of a slideway to receive the key 11. When the two housings 29 are assembled together the two plates 43 and the adjacent edges of the recesses 36 of the two housings complete a cavity or guideway into which the coded front plate part 20 of key 11 can be inserted as indicated in FIG. 6.

Figure 3:
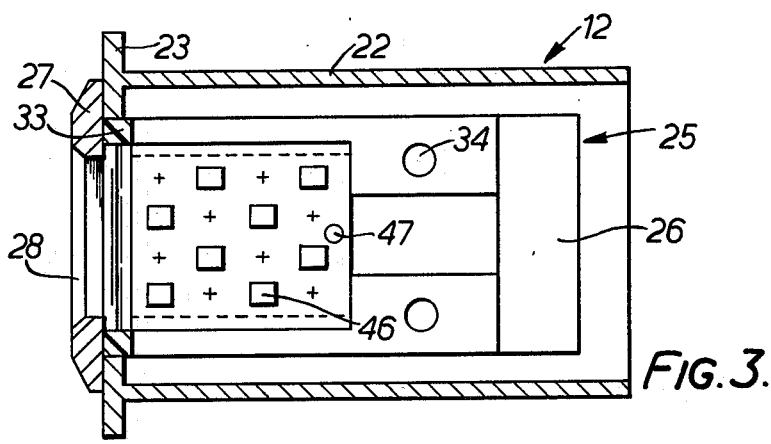
FIG. 3 is a cross-section on the line 3—3 in FIG. 2.

The two printed circuit boards 42 each carry eight Hall Effect devices 46 according to the pattern indicated in FIG. 3. It will be appreciated that because of the inversion of one housing 29 with respect to the other on assembly of reader unit 25 the Hall Effect devices on the board 42 to one side of the key guideway will correspond with eight of the sixteen matrix locations and the eight Hall Effect devices on the board 42 to the other side of the guideway will correspond with the remaining eight matrix locations. The printed circuits on boards 42 provide circuit paths to terminal strips at the inner edges of the boards adjacent housing channels 41. Electrical leads are connected to the terminal strips and extend from the reader unit via the housing channels 41 into casing 22 where they are connected to circuit boards installed in the casing as will be described below.

In addition to the Hall Effect devices 46, circuit boards 42 also carry at their inner ends the two components of an infra-red transmitter/receiver sensing device 47 which senses insertion of key 11. One of the boards carries the emitter of device 47 and the other board carries the receiver. The transmitter and the receiver of the key sensor are connected by circuit paths on boards 42 to respective terminal strips which are connected to appropriate electrical components installed in casing 22 by wires extended through housing channels 41.

Yoke member 33 at the front of sensor unit 25 defines a slide for vertical sliding movements of a guideway barrier member 48. Member 48 is normally biased upwardly by a pair of springs 49 against the upper crosspiece of yoke member 33 so as to block the key guideway entrance but its upper edge is chamfered so that on insertion of the key it will be wedged downwardly and will not impede entry of the key into the guideway. It does however provide an effective seal against entry of dust or other foreign material when the key is withdrawn.

Figure 8:
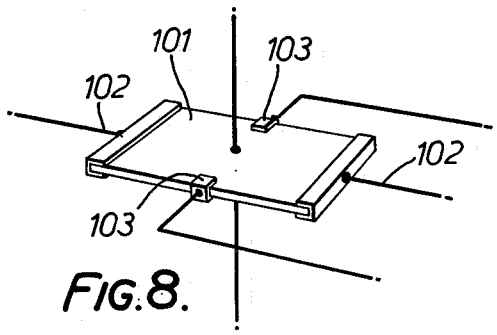
FIG. 8 is a diagrammatic representation of a Hall Effect device.

The basic principles of operation of a Hall Effect device is shown diagrammatically in FIG. 8. As shown in this Figure a Hall Effect device generally comprises a semi-conductor layer 101 fitted with a pair of control current electrodes 102, through which to pass a control current through the layer in one direction and a second pair of electrodes 103 to detect a potential difference between locations on the semi-conductor layer which are spaced apart in a direction transverse to the direction of the control current. When a control current $i$ is passed via eletrodes 102 through the semi-conductor layer 101 whilst a magnetic field of flux density B is perpendicular to the plane of the semi-conductor a potential difference (open-circuit Hall voltage V) is developed between electrodes 103, in accordance with equation $V = (R_h/d) \cdot i \cdot B$ where $R_h$ is a constant (Hall constant) of the semi-conductor material and $d$ is the thickness of the semi-conductor layer.

Figure 9:
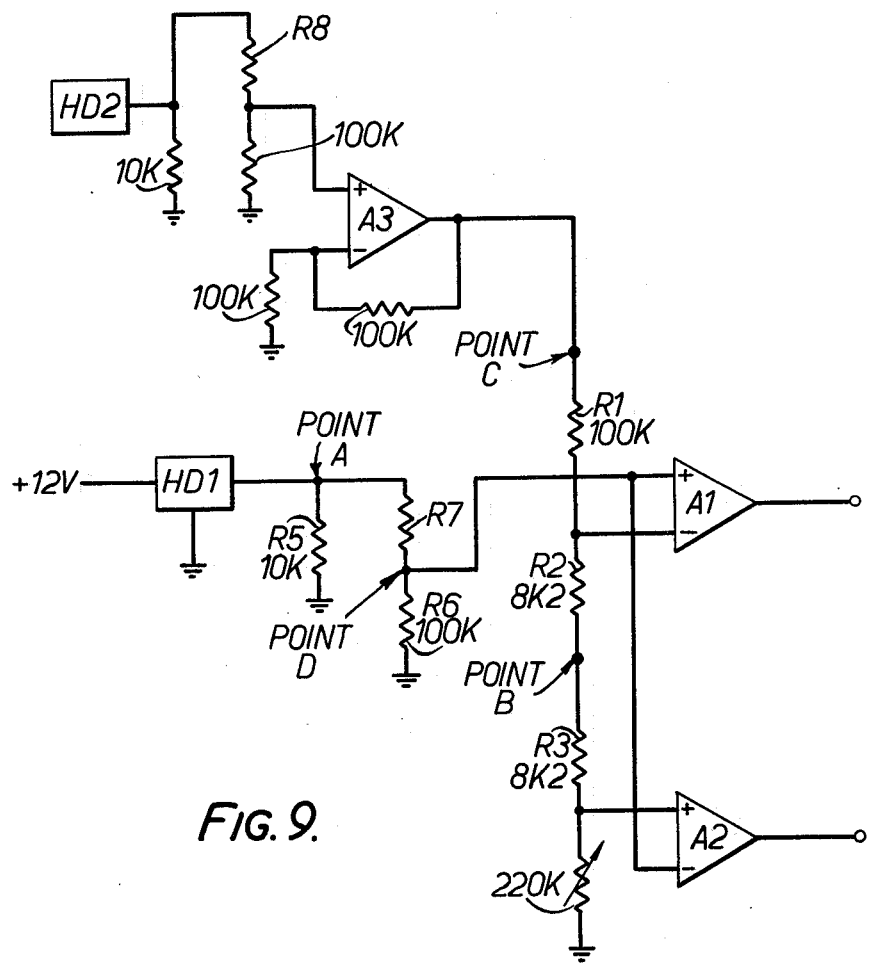
FIG. 9 illustrates amplification circuitry for amplifying a potential difference generated in a Hall Effect device incorporated in the reader.

Hall Effect devices which operate in the manner indicated in FIG. 9 can be obtained commercially. Generally, the semi-conductor layer is formed either as a wafer produced from semi-conductor bars by cutting, grinding and etching; as a layer which is vapour deposited on a chip; or as a GaAs layer grown epitaxially from the gas phase on semi-insulating GaAs.

It has been found that Hall Effect devices known as HONEYWELL TYPE 63SS2C are particularly suitable for use in the illustrated apparatus. These devices have sensors and amplifiers integrated into the same sensing chips so as to provide an amplified output signal. They are, in fact, capable of providing two amplified outputs, one being a "true" output and the other a "compliment" of the first output. Only one of these outputs need be used in the illustrated apparatus. The device has an output of ± 0.9mV/Gauss over a sensitivity range of ± 400 Gauss with a constant supply voltage of 5vDC ± 5% and at a temperature of 24° ± 2° C.

The potential difference generated by each Hall Effect device is of the order of only 400 millivolts. This presents a signal having a polarity dependent upon the direction of the magnetic field applied to the Hall Effect device, i.e. a key magnet which registers with the Hall Effect device with its north pole facing that device will generate a Hall Effect potential difference on one polarity, whereas a key magnet which registers with its south pole facing the Hall Effect device will generate a potential difference of opposite polarity. The Hall Effect potential difference are amplified to levels compatible with a logic system of the reader by the circuitry of FIG. 9.

As shown in FIG. 9 the Hall Effect device HD1 is connected to a 12 volt supply. Under these conditions, it has a standing output offset voltage of the order of +4 v±0.5v. The output voltage is applied through two series resistors R6, R7, to earth and the junction point D between the resistors is connected to the positive input of operational amplifier A1 and the negative input of operational amplifier A2. Point D is set by selection of resistor R7 to apply +3v to the positive and negative inputs of amplifiers A1 and A2 respectively. To ensure that this voltage does not switch A1 hard on and A2 hard off, the negative and positive inputs of A1 and A2 respectively are held at ± 180 mV respectively of the voltage at point D. This is done by applying a voltage to point C which sets point B at +3v. The current flow through R1, R2, R3 and R4 will cause a drop of 180mV each across R2 and R3 making the negative input of A1 180mV more positive than the positive input of A1, and the positive input of A2 180mV more negative than the positive input of A2. An additional requirement of the circuit is to provide temperature stabilisation of the amplifying circuitry of the Hall Effect device. This is achieved by supplying the voltage to point C from a temperature reference source, which is a X2 amplifier A3 with a Hall Effect device HD2 as the input source voltage. As the temperature varies the output of the Hall Effect device varies as do the outputs of the Hall Effect devices on boards 42. The output voltage of the Hall Effect device is multiplied by 2, by amplifier A3 and applied to point C, where it is potted down by R1, R2, R3 and R4. By selecting R8 the voltage at point B can be set to equal the voltage at point A. When point A varies in temperature so does point B by the same proportion thus holding point B at the same voltage as point A.

Figure 10:
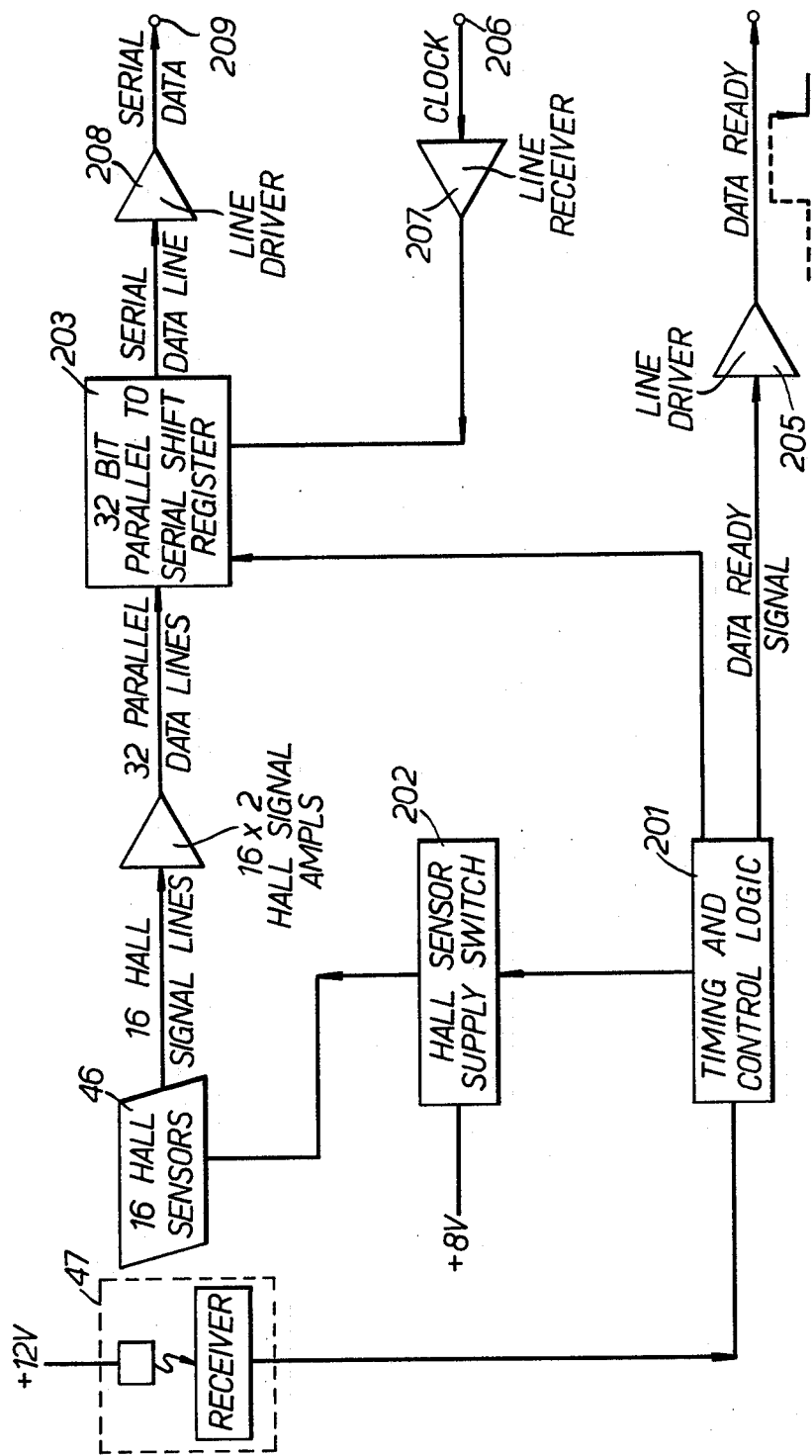
FIG. 10 is a block diagram of the electrical circuit of the reader.

Each sensor device has an amplifying circuit identical to that shown in FIG. 9 and these are connected into the electrical circuit of the reader which is illustrated in block diagram form in FIG. 10. The sequence of operation of the various components of the circuit is shown in the timing diagram of FIG. 11.

Until a key is inserted into the reader unit radiation emitted from the emitter of key sensor 47 is collected by the receiver of that sensor unit. However, when a key is fully inserted into the slideway its front end interrupts the radiation beam and key sensor 47 transmits a signal to a timing and control logic 201 which is mounted on a circuit board carried within casing 22. Having received a signal that the key is in the correct position, the timing and control logic 201 sends a signal to a Hall sensor supply switch 202, which may simply be a transistor mounted on the same circuit board as the timing and control logic and connected so as to be turned on by the signal from that logic. Switch 202 then supplies +8v to the Hall sensor devices 46 for a period of time sufficient to allow the signals from the Hall Sensor device to settle and therefore to allow the outputs of the 16 pairs of signal amplifiers A1, A2 to assume their correct values.

After a time delay sufficient to enable output of the Hall signal amplifiers to settle, the timing and control logic 201 sends a "Load Parallel Data" signal to a 32-bit parallel shift register 203 which is connected by 32 parallel data lines to the 16 pairs of Hall signal amplifiers A1, A2. The 32 bits of key data are then loaded in parallel into the shift register.

After a time interval sufficient to ensure that the key data has been loaded into shift register 203, timing and control logic 201 sends a "Data Ready" signal to a "Data Ready" output terminal 204 via a line driver 205 which is provided to buffer the output. When the key is withdrawn from the reader unit the "Data Ready" output goes from "High" to "Low" and the resulting "High to Low" edge is used as a signal to initiate 32 clock pulses which are fed via a terminal 206 and through a line receiver 207 to the clock input of shift register 203. These pulses clock the 32 bits of data serially out of register 203 and via a line driver 208 to the output terminal 209 of the reader.

The serial output of the reader taken from terminal 209 may be used in different ways according to the particular application of the apparatus. In the case of a door access control system this output may be transmitted to a central processing unit where the serial information may be converted back to parallel form and fed to a "hard-wired" decoder which determines whether the key code is correct or incorrect and, if correct, sends a signal to open an electrically controlled door or to perform some other access function.

Line drivers 205 and 208 may be transistors connected in the emitter/follower mode and line receiver 207 may simply be a clamping resistor. Timing and control logic 201 and shift register 203 may be of conventional design and appropriate circuitry can readily be chosen by those skilled in the relevant art.

The Hall signal amplifiers are carried on a circuit board mounted in casing 22 to one side of reader unit 25 and the wires from the Hall Effect device boards 44 are connected to this board. The temperature reference components are carried on a further circuit board mounted within casing beneath reader unit 25 and this board may also carry part of the amplifier circuitry. A further circuit board is mounted in the casing to the other side of reader unit 25 to carry the timing and control logic 201, Hall sensor supply switch 202, shift register 203, line driver 205, 208 and line receiver 207.

As previously mentioned key sensor 47 comprises an emitter and a receiver. More particularly, it comprises a light emitting diode and a photo-transistor. The light emitting diode has a 2k7 resistor connected in series with its anode to a +12v supply with its cathode is connected to 0V. The phototransistor has a 22K resistor in its collection circuit which is connected to +12v and its emitter is connected to 0V. The junction of the collector and the 22K resistor is connected to the timing and control logic. When wired in this way the phototransistor extends a "Low" signal to timing and control logic 201 when it receives radiation from the light emitting diode and a "High" signal when the beam of radiation is interrupted by the key.

The illustrated apparatus differs from the apparatus disclosed in prior Australian Pat. No. 65612/74 and granted U.S. Pat. No. 3,953,712, essentially in that the coded signals are generated in the sensing devices by the Hall Effect while the key is stationary. The speed of movement of the key into the reader is not critical and more even signals are generated in the sensing devices. The use of the Hall Effect sensing devices also enables construction of a reader with completely solid state electrical components. However, the illustrated apparatus has been advanced by way of example only and the invention is in no way limited to the details of that apparatus. For example, it would be possible to replace the 16 pairs of Hall signal amplifiers with a single pair of amplifiers and to provide appropriate circuitry sequentially to amplify the Hall signals with the single pair of amplifiers and to transmit the amplified signals directly in serial form to a central processing unit. Moreover, the invention is not limited in application to magnetic locking systems and the serial output from the reader could be fed directly to a computer. It is accordingly to be understood that many modifications and variations may be made to the illustrated apparatus without departing from the scope of the appended claims.

We claim:

1. Magnetic identification apparatus comprising a magnetically coded instrument and a reader to which to apply the instrument, said instrument having a flat plate part including a plurality of discrete magnetized portions disposed at certain locations on a rectangular grid of possible locations to determine the magnetic code of the instrument, and said reader comprising:

a body defining a flat cavity to serve as a guideway for said flat part of said instrument;

a pair of parallel sensor mounting plates disposed on opposite sides of said cavity;

a plurality of sensor elements equal in number to the number of said possible locations and mounted on said sensor mounting plates such that the sensor elements on one plate register with alternate ones of said possible locations on said flat plate part of said instrument when said instrument is inserted within said cavity and the sensor elements on the other plate register with the remainder of said possible locations, said sensor elements each being comprised of a Hall Effect device including a semi-conductor layer, a pair of control current electrodes through which to pass a control current through said semi-conductor layer in one direction and a pair of sensor electrodes through which to sense a potential difference between locations on the semi-conductor layer which are spaced apart in a direction which is transverse to said one direction, said Hall Effect devices being oriented such that potential differences are generated by the presence of the magnetic fields of said magnetized portions of the instrument;

electrical input means to supply control current to the electrodes of the Hall Effect devices; and electric output means, conditioned by the generation of potential differences between the sensing electrodes of the Hall Effect devices, to provide an electrical output from the reader.

2. Magnetic identification apparatus as claimed in claim 1 wherein said reader further includes switch means, normally rendering said electric input means ineffective to supply control current through the control current electrodes of the Hall Effect devices, but responsive to insertion of said instrument into said guideway to render said electric input means operative when said code locations on the instrument register with said sensor elements of the reader.

3. Magnetic identification apparatus as claimed in claim 2, wherein said switch means comprises an infrared radiation emitter to one side of said guideway and an infrared radiation receiver disposed to the other side of said guideway so as to receive radiation from the emitter, said emitter and said receiver being located such that the passage of radiation from said emitter to said receiver is interrupted by said instrument when said code locations on said instrument register with said sensor elements of said reader.

4. Magnetic identification apparatus comprising a magnetically coded instrument including a plurality of discrete magnetized portions, the disposition of which determines the magnetic code of said instrument, and a reader to which to apply said instrument, said reader comprising:

a body defining instrument setting means to set the instrument in a set position relative to said body;

a plurality of sensor elements mounted on said body so as to register with said magnetic portions of said instrument when said instrument is in said set position, which sensor elements are each comprised of a Hall Effect device including a semi-conductor layer, a pair of control current electrodes through which to pass a control current through said semi-conductor layer in one direction and a pair of sensor electrodes through which to sense a potential difference between locations on said semi-conductor layer which are spaced apart in a direction transverse to said one direction, said Hall Effect devices being oriented such that said potential differences are generated by the presence of the magnetic fields of said magnetized portions of the instrument when the instrument is in said set position; and electrical input means to supply control current to said control current electrodes of said Hall Effect devices;

electric output means condition by the generation of potential differences between said sensing electrodes of said Hall Effect devices to provide an electrical output from said reader, said electric output means comprising an amplifier means connected to each said Hall Effect device to produce an amplification of the potential difference between the sensing electrodes of that device;

temperature stabilization circuitry connected to said amplifier means to provide compensation for changes in the potential differences generated between said sensing electrodes of each of said Hall Effect devices because of temporary variations.

5. Magnetic identification apparatus as claimed in claim 4, wherein the temperature stabilization circuitry comprises a temperature reference Hall Effect device which is mounted on said reader at a position such that it is not influenced by said magnetized portions of the instrument when said instrument is in said set position, and which provides a standing output voltage, which is purely temperature dependent, to said amplifier means via amplifier circuitry so that any change in the input to said amplifier means from the Hall Effect devices forming said sensor elements due to temperature variation is offset by a compensating change in the input from said temperature reference Hall Effect device.

* * * * *